United States Patent
Robertson et al.

(10) Patent No.: US 8,842,735 B2
(45) Date of Patent: Sep. 23, 2014

(54) METHOD TO IMPROVE DETECTION OF MOTION WITH PHASE CORRELATION

(75) Inventors: Mark Robertson, Cupertino, CA (US); Ming-Chang Liu, San Jose, CA (US); Yoshihiro Murakami, Atsugi (JP); Toru Kurata, Ageo (JP); Yutaka Yoneda, Yokohama (JP)

(73) Assignee: Sony Corporation, Tokyo (JP)

( * ) Notice: Subject to any disclaimer, the term of this patent is extended or adjusted under 35 U.S.C. 154(b) by 322 days.

(21) Appl. No.: 12/912,561

(22) Filed: Oct. 26, 2010

(65) Prior Publication Data

US 2012/0099651 A1 Apr. 26, 2012

(51) Int. Cl.
  *H04N 11/02* (2006.01)
  *H04N 19/523* (2014.01)
  *H04N 19/615* (2014.01)
  *H04N 19/51* (2014.01)
  *H04N 19/547* (2014.01)

(52) U.S. Cl.
  CPC ..... *H04N 19/00636* (2013.01); *H04N 7/26808* (2013.01); *H04N 7/2659* (2013.01); *H04N 7/364* (2013.01); *H04N 19/0063* (2013.01)
  USPC .................................................. 375/240.16

(58) Field of Classification Search
  None
  See application file for complete search history.

(56) References Cited

U.S. PATENT DOCUMENTS

| | | | |
|---|---|---|---|
| 5,005,078 A | | 4/1991 | Gillard |
| 5,682,205 A | * | 10/1997 | Sezan et al. ............. 348/452 |
| 5,940,145 A | * | 8/1999 | Burl ........................ 348/699 |
| 6,057,892 A | * | 5/2000 | Borer ....................... 348/699 |
| 6,075,818 A | | 6/2000 | Thomson |
| 6,170,049 B1 | * | 1/2001 | So ............................ 712/35 |
| 6,611,560 B1 | * | 8/2003 | Kresch et al. ......... 375/240.16 |
| 6,940,892 B2 | * | 9/2005 | Okubo et al. ............ 375/130 |
| 7,349,583 B2 | * | 3/2008 | Kumar et al. ............ 382/294 |
| 7,373,437 B2 | * | 5/2008 | Seigneret et al. .......... 710/22 |
| 7,620,269 B1 | | 11/2009 | Nandy |
| 7,627,067 B2 | * | 12/2009 | Coulson .................. 375/362 |

(Continued)

FOREIGN PATENT DOCUMENTS

EP 2207139 A1 7/2010

OTHER PUBLICATIONS

Takita et al. "High-Accuracy Subpixel Image Registration Based on Phase-only Correlation." (Aug. 2003) IEICE Trans. Fundamentals, vol. E86-A, No. 8.*

(Continued)

*Primary Examiner* — Sath V Perungavoor
*Assistant Examiner* — Matthew J Anderson
(74) *Attorney, Agent, or Firm* — Haverstock & Owens LLP (57) ABSTRACT

Phase correlation is an established method for computing motion which relies on the ability to find peaks in a computed phase correlation surface. Two methods to improve the ability to detect peaks in the phase correlation surface are described herein. The first method applies a theoretically-derived and spatially-varying gain to the phase correlation surface. The gain compensates for peaks whose amplitudes have been decreased due to windowing effects; such effects are unavoidable in phase correlation. The second method uses concepts from matched filters to improve detection of peaks whose amplitudes are diminished due to a spreading of the peak energy into surrounding positions in the phase correlation surface. Peak detection filters allow such low-amplitude peaks to be properly detected. It is possible to use only the first method, or only the second method or both methods combined.

18 Claims, 7 Drawing Sheets

(56) References Cited

U.S. PATENT DOCUMENTS

| | | | |
|---|---|---|---|
| 7,668,247 B2* | 2/2010 | Balakrishnan et al. | 375/260 |
| 7,751,482 B1* | 7/2010 | Srinivasan et al. | 375/240.16 |
| 7,751,591 B2* | 7/2010 | Bober et al. | 382/107 |
| 7,761,617 B2* | 7/2010 | Seigneret et al. | 710/22 |
| 7,809,208 B2 | 10/2010 | Kang | |
| 7,831,065 B2* | 11/2010 | Zimmermann et al. | 382/107 |
| 8,155,452 B2* | 4/2012 | Minear | 382/218 |
| 8,169,542 B2* | 5/2012 | Mogre et al. | 348/445 |
| 8,170,089 B2* | 5/2012 | Park et al. | 375/229 |
| 8,233,730 B1* | 7/2012 | Namboodiri et al. | 382/236 |
| 8,285,079 B2* | 10/2012 | Robertson et al. | 382/294 |
| 8,311,116 B2* | 11/2012 | Namboodiri et al. | 375/240.16 |
| 8,473,689 B2* | 6/2013 | Anderson et al. | 711/137 |
| 2002/0097342 A1 | 7/2002 | Hu | |
| 2011/0176013 A1* | 7/2011 | Robertson et al. | 348/208.4 |
| 2011/0229056 A1* | 9/2011 | Robertson et al. | 382/294 |

OTHER PUBLICATIONS

Turin, George. "An Introduction to Matched Filters". IRE Trans. on Information Theory. (Jun. 1960).*

Takita et al. "High-Accuracy Subpixel Image Registration based on Phase-Only Correlation" IEICE Trans. Fundamentals, vol. E86-A, No. 8 (Aug. 2003).*

Su et al. "Robust Global Motion Estimation from Coarsely Sampled Motion Vector Fields". (Jun. 2003) Proceeding of SPIE, vol. 5022, p. 98-101.*

G.A. Thomas, et al.,"Television Motion Measurement for Datv and Other Applications", (PH-283), XP000611063, pp. 1-20.

* cited by examiner

Reference Block    Current Block    Wrap-around effect due to FFT periodicity, for current block aligned with reference block

METHOD TO IMPROVE DETECTION OF MOTION WITH PHASE CORRELATION

FIELD OF THE INVENTION

The present invention relates to the field of image/video processing. More specifically, the present invention relates to performing phase correlation motion estimation.

BACKGROUND OF THE INVENTION

The process of performing motion estimation is able to be implemented in a number of ways. One implementation includes utilizing phase correlation. Phase correlation uses a frequency-domain approach to estimate the relative translative offset between two similar images.

SUMMARY OF THE INVENTION

Phase correlation is an established method for computing motion which relies on the ability to find peaks in a computed phase correlation surface. Two methods to improve the ability to detect peaks in the phase correlation surface are described herein. The first method applies a theoretically-derived and spatially-varying gain to the phase correlation surface. The gain compensates for peaks whose amplitudes have been decreased due to windowing effects; such effects are unavoidable in phase correlation. The second method uses concepts from matched filters to improve detection of peaks whose amplitudes are diminished due to a spreading of the peak energy into surrounding positions in the phase correlation surface. Peak detection filters allow such low-amplitude peaks to be properly detected. It is possible to use only the first method, or only the second method or both methods combined.

In one aspect, a method of performing phase correlation motion estimation in a video programmed in a memory in a device comprises applying an amplitude gain to a phase correlation surface prior to detecting for peaks and implementing a matched filter for peak detection. Phase correlation motion estimation further comprises applying a window function to a window of a current frame to obtain a current frame result, applying a Fast Fourier Transform to the current frame result yielding a first set of complex values, applying the window function to the window of a reference frame to obtain a reference frame result, applying the Fast Fourier Transform to the reference frame result yielding a second set of complex values, normalizing a product of the second set of complex values and a complex conjugate of the first set of complex values, computing an inverse Fast Fourier Transform to yield a phase correlation surface and identifying one or more peaks from the phase correlation surface, wherein indices of the peaks correspond to possible motions. The method further comprises implementing sub-pixel estimation. Implementing the matched filter comprises performing peak finding using the matched filter $p_R[x,y; mx_k, my_k]$ for each k=0 through M−1 and retaining as motion estimation candidates the biggest peaks from the matched filters. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In another aspect, a method of performing phase correlation motion estimation in a video programmed in a memory in a device comprises applying a window function to a window of a current frame to obtain a current frame result, applying a Fast Fourier Transform to the current frame result yielding a first set of complex values, applying the window function to the window of a reference frame to obtain a reference frame result, applying the Fast Fourier Transform to the reference frame result yielding a second set of complex values, normalizing a product of the second set of complex values and a complex conjugate of the first set of complex values, computing an inverse Fast Fourier Transform to yield a phase correlation surface, applying an amplitude gain to a phase correlation surface prior to detecting for peaks and identifying one or more peaks from the phase correlation surface, wherein indices of the peaks correspond to possible motions. The method further comprises implementing sub-pixel estimation. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In yet another aspect, a method of performing phase correlation motion estimation in a video programmed in a memory in a device comprises applying a window function to a window of a current frame to obtain a current frame result, applying a Fast Fourier Transform to the current frame result yielding a first set of complex values, applying the window function to the window of a reference frame to obtain a reference frame result, applying the Fast Fourier Transform to the reference frame result yielding a second set of complex values, normalizing a product of the second set of complex values and a complex conjugate of the first set of complex values, computing an inverse Fast Fourier Transform to yield a phase correlation surface and identifying one or more peaks from the phase correlation surface using a matched filter, wherein indices of the peaks correspond to possible motions. The method further comprises implementing sub-pixel estimation. Using the matched filter comprises performing peak finding using the matched filter $p_R[x,y; mx_k, my_k]$ for each k=0 through M−1 and retaining as motion estimation candidates the biggest peaks from the matched filters. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In yet another aspect, a system for performing phase correlation motion estimation in a video programmed in a memory in a device comprises an amplitude module for applying an amplitude gain to a phase correlation surface prior to detecting for peaks and a peak identification module with matched filters for identifying one or more peaks from the phase correlation surface, wherein indices of the peaks correspond to possible motions. The system further comprises a first window function module for applying a window function to a window of a current frame to obtain a current frame result, a first Fast Fourier Transform module for applying a Fast Fourier Transform to the current frame result yielding a first set of complex values, a second window function module for applying the window function to the window of a reference frame to obtain a reference frame result, a second Fast Fourier Transform module for applying the Fast Fourier Transform to the reference frame result yielding a second set of complex values, a normalizing module for normalizing a product of the second set of complex values and a complex conjugate of the first set of complex values, an inverse Fast Fourier Transform module for computing an inverse Fast Fourier Transform to yield a phase correlation surface and a peak identification module for identifying one or more peaks from the phase correlation surface, wherein indices of the peaks correspond to possible motions. The system further comprises a sub-pixel estimation module for computing sub-pixel estimates for previously identified peaks. Identifying the peaks comprises performing peak finding using the matched filter $p_R[x,y; mx_k, my_k]$ for each k=0 through M−1 and retaining as motion estimation candidates the biggest peaks from the matched filters. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In yet another aspect, a camera device comprises a video acquisition component for acquiring a video, an encoder for encoding the image, including phase correlation motion estimation, by applying an amplitude gain to a phase correlation surface prior to detecting for peaks and implementing a matched filter for peak detection and a memory for storing the encoded video. Phase correlation motion estimation further comprises applying a window function to a window of a current frame to obtain a current frame result, applying a Fast Fourier Transform to the current frame result yielding a first set of complex values, applying the window function to the window of a reference frame to obtain a reference frame result, applying the Fast Fourier Transform to the reference frame result yielding a second set of complex values, normalizing a product of the second set of complex values and a complex conjugate of the first set of complex values, computing an inverse Fast Fourier Transform to yield a phase correlation surface and identifying one or more peaks from the phase correlation surface, wherein indices of the peaks correspond to possible motions. The camera device further comprises computing sub-pixel estimates for previously identified peaks. Implementing the matched filter comprises performing peak finding using the matched filter $p_R[x,y; mx_k, my_k]$ for each k=0 through M−1 and retaining as motion estimation candidates the biggest peaks from the matched filters.

DETAILED DESCRIPTION OF THE PREFERRED EMBODIMENT

Phase correlation is an established method for computing motion, which relies on the ability to find peaks in a computed phase correlation surface. Traditionally, peak detection in the context of phase correlation includes simply searching the phase correlation surface for the biggest value. Such an approach works well in non-demanding situations, but in more challenging circumstances there are two limiting factors: the sought peak is able to decrease in amplitude, while the surrounding noise is able to increase in strength. These two factors are able to cause the peak to become difficult to identify, often resulting in incorrect estimates of motion. Two methods to improve the ability to detect peaks, and hence motion, in the phase correlation surface are described herein. Each of the methods addresses a different phenomenon of phase correlation:

1. The first method applies a theoretically-derived and spatially-varying gain to the phase correlation surface. The gain compensates for peaks whose amplitudes have been decreased due to windowing effects; such effects are unavoidable in phase correlation. Without the improved method, the reduced-amplitude peaks are able to become obscured by noise and missed by a peak detection algorithm.

2. The second method uses concepts from matched filters to improve detection of peaks whose amplitudes are diminished due to a spreading of the peak energy into surrounding positions in the phase correlation surface. Peak detection filters allow such low-amplitude peaks to be properly detected, when the peaks could otherwise be obscured by noise in the phase correlation surface and hence missed by a peak detection algorithm. It is possible to use only the first method, or only the second method or both methods combined.

Motion estimation is the process of determining motion vectors that describe the transformation from one image to another. Motion estimation is able to be performed between images or image blocks. There are many applications of motion estimation, such as estimating motion between the images of FIG. 1.

Figure 1:
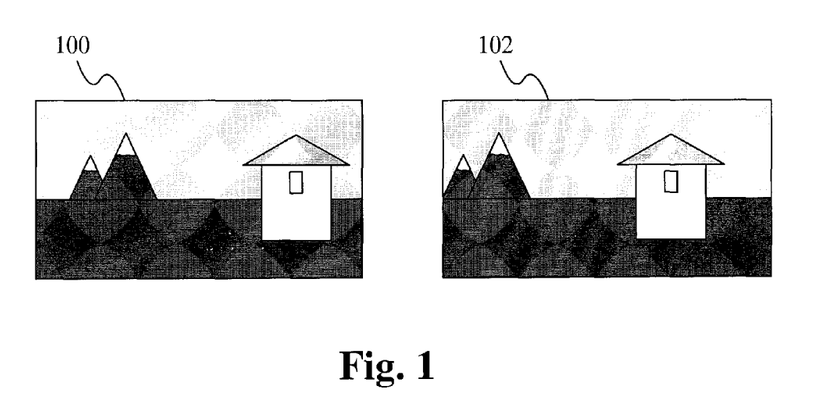
FIG. 1 illustrates two images whose motion is able to be estimated.

FIG. 1 illustrates two images whose motion is able to be estimated. Image 102 is the same scene as image 100, but the camera has panned to the right in the image 102. If the images are aligned by estimating the motion between them, there are numerous possible applications. One such application is to stitch them together as part of a panoramic image, which is able to be further extended spatially by continuing the process with more images as the camera pans further right. Another application is to reduce noise by averaging together pixel observations that correspond to the same location in both images. Motion estimation is also commonly used to form motion-compensated predictions as part of video compression. There are many other applications as well.

Phase correlation is able to be applied to an entire image or to sub-blocks within an image. Although application to image sub-blocks is described herein, application to the whole image is accomplished by letting the block size and window size cover the entire image.

Figure 2:
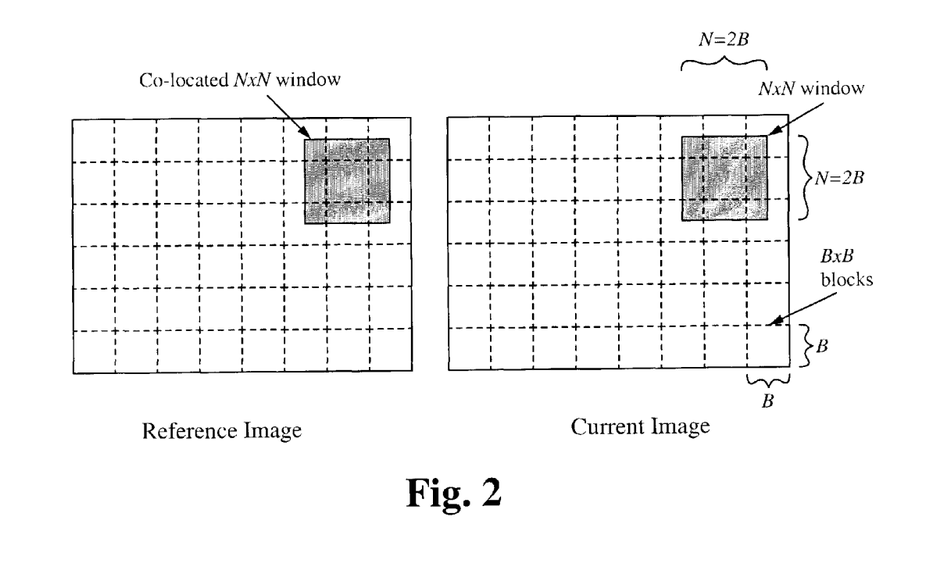
FIG. 2 illustrates an example of co-located blocks.

Local motion analysis is performed on each B×B block in an image. Phase correlation estimates motion by considering a window that surrounds the B×B target block. A surrounding window size of N×N where N=2B is used, but in general other window sizes and shapes are able to be used. Phase correlation considers an N×N window in both the current image and the reference image, where the windows are able to be co-located or, in the more general case, an offset is able to be present for the block in the reference frame due to a motion predictor. FIG. 2 illustrates an example of co-located blocks.

Figure 3:
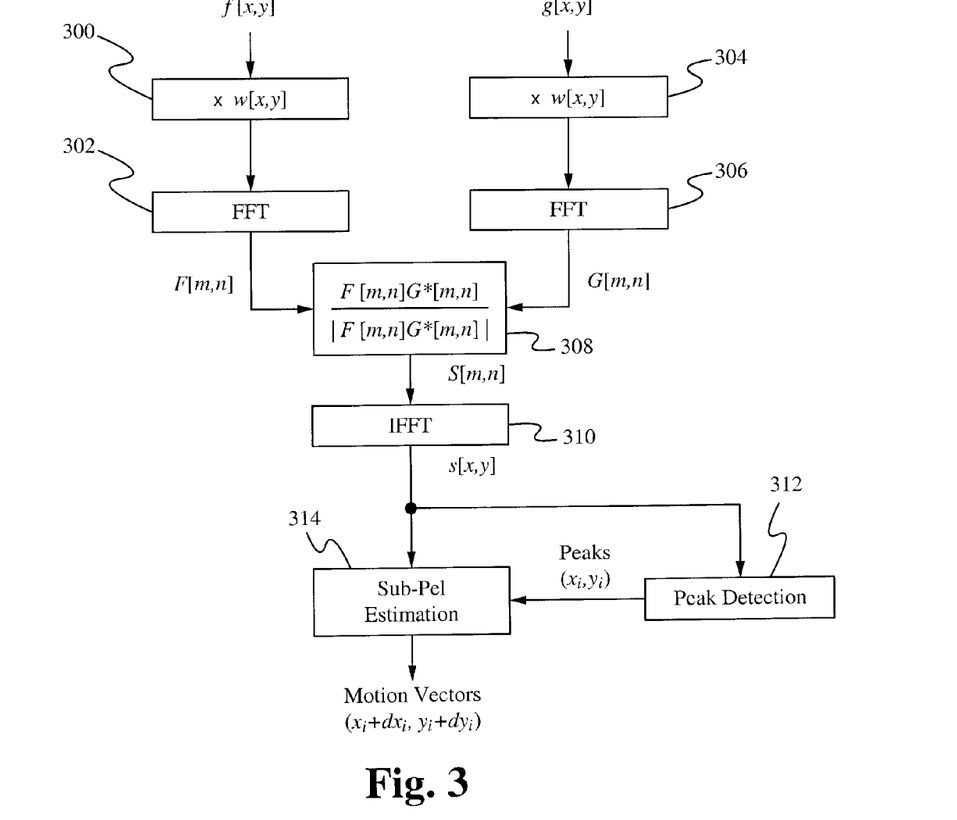
FIG. 3 illustrates a flowchart of phase correlation according to some embodiments.

FIG. 3 illustrates a flowchart of phase correlation according to some embodiments. In the step 300, point-wise multiplication of the N×N window in the current frame with window function w[x,y] is performed. In the step 302, a Fast Fourier Transform (FFT) is applied to the result, which yields the complex values F[m,n]. In the step 304, point-wise multiplication of the N×N window in the reference frame is performed with the window function w[x,y]. In the step 306, a FFT is applied to the result, which yields the complex values G[m,n]. In the step 308, in the normalization stage, the following equation is computed:

$$S[m,n] = \frac{F[m,n]G^*[m,n]}{|F[m,n]G^*[m,n]|},$$

where * denotes the complex conjugate, and | | represents the magnitude of the complex argument. In the step 310, the inverse FFT (IFFT) of S[m,n] is computed to yield s[x,y], the phase correlation surface. In the step 312, the K biggest peaks are identified from the phase correlation surface. The indices of these peaks correspond to possible motions that are present between the N×N windows in the current and reference frames. The indices of these peaks are denoted as $(x_i, y_i)$, i=0, ..., K−1. The indices are positive integers in 0, 1, ..., N−1. A negative motion of −q leads to a peak at index position N−q. In the step 314, if sub-pixel precision is used, sub-pixel estimates $(dx_i, dy_i)$ are computed for the peaks $(x_i, y_i)$ previously identified.

For the window function, a 2-D separable extension of the Hamming window is used, w[x,y]=w[x]w[y], $$w[x] = \begin{cases} 0.53836 - 0.46164 \cos\left(\frac{2\pi x}{N-1}\right) & x = 0, 1, \ldots, N-1 \\ 0, & \text{else.} \end{cases}$$

Other implementations are able to be used as well, such as a Hann window, a Blackman window, a Bartlett window or any other window.

The peaks in the correlation surface represent possible motions. Larger peaks indicate higher correlation, and the largest peak often indicates the dominant motion in the N×N window.

Improved peak finding by applying gain to the phase correlation surface is described herein. Phase correlation is a motion estimation technique that computes a normalized cross correlation in the frequency domain with the FFT. Using an FFT of size N makes an implicit assumption that the signal is periodic in both space and frequency with period N. A window function (such as a Hamming window) is used to prevent errors in the correlation due to the "wrapping" effect from periodicity.

Figure 4:
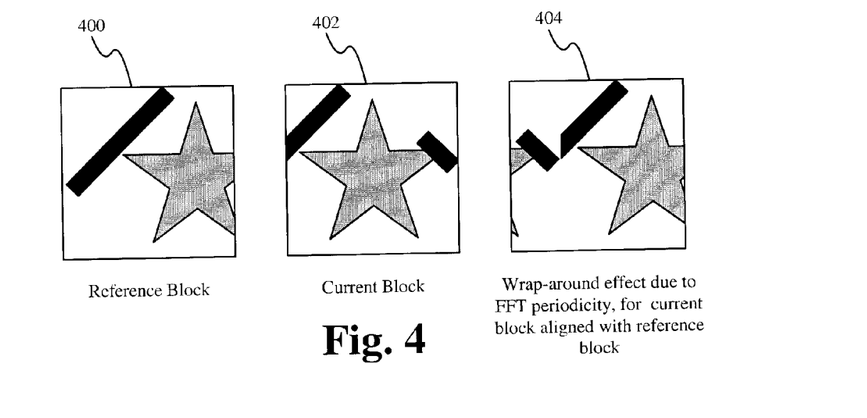
FIG. 4 illustrates an example of decreasing correlation with increasing motion.

For phase correlation, a consequence of windowing is that the magnitude of the correlation peak will decrease as the motion deviates from zero. An example of this is shown in FIG. 4. If there were no motion, the stars in the current block 402 and the reference block 400 would coincide perfectly, and a very strong peak would be observed in the phase correlation surface. However, if there is motion as shown between the current block 402 and reference block 400, then there is an implicit periodicity imposed by using the FFT to compute correlation, as shown in the wrap-around block 404. The block 404 demonstrates that by using the FFT to compute correlation, the actual correlation value for the shift corresponding to the true motion (between the current block 402 and the reference block 400) includes both desired and undesired components. There are two main effects. First, there is less overlapping area between the image content in the reference block 400 and the wrap-around block 404, so there is less energy for the correlation peak. Second, the false information introduced by the periodicity, shown at the left of the block in the block 404, appears as noise in the phase correlation surface. In practice, not only the area of overlap is important, but also the effect of the window w[x,y], which is not explicitly shown.

As motion increases, the peak in the correlation surface decreases accordingly because the area of overlap of the desired components decreases, while noise in the phase correlation surface increases. This unfortunate combination makes the true phase correlation peak more difficult to find for bigger motions, because the peak is able to become obscured by noise.

Figure 5:
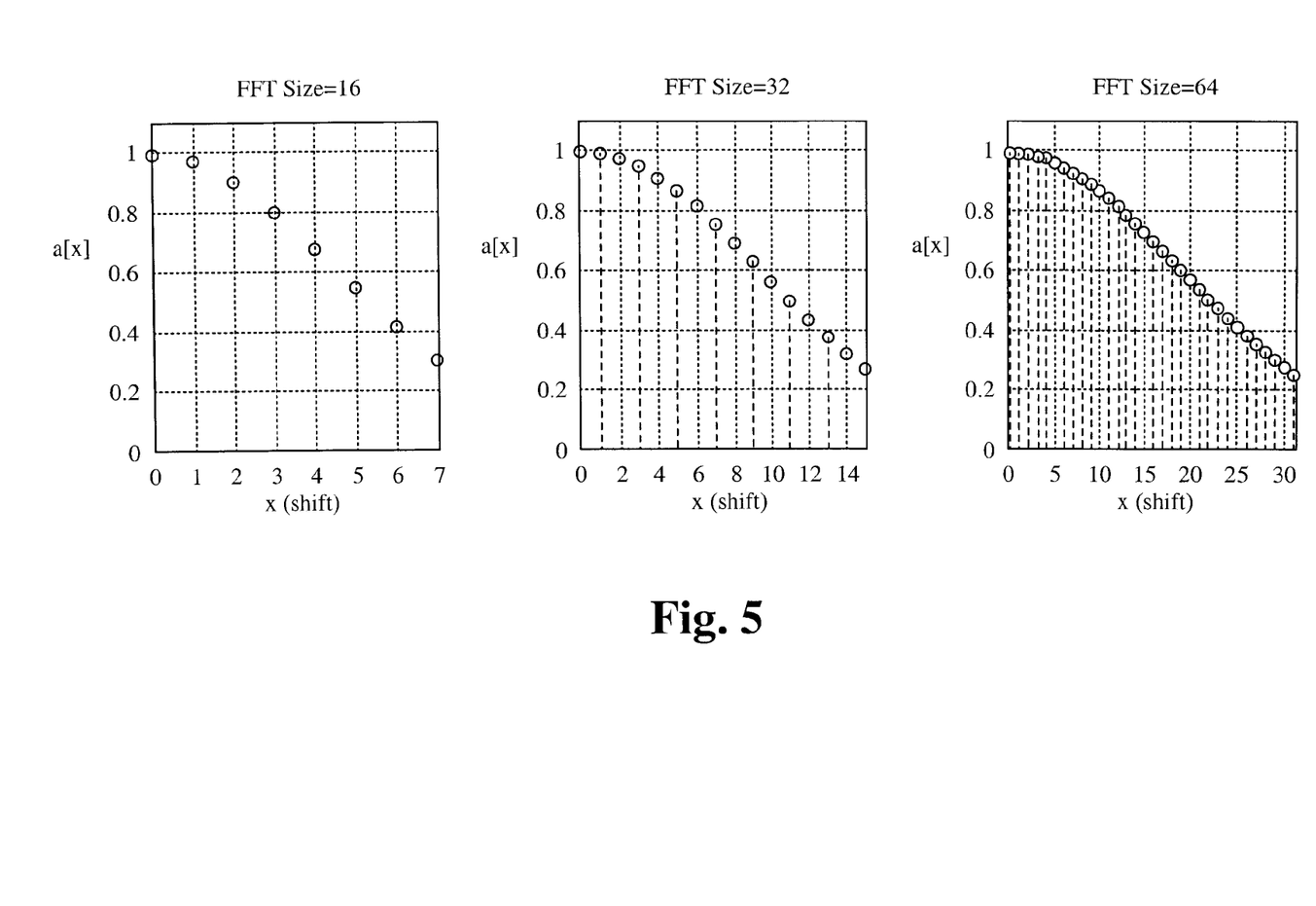
FIG. 5 illustrates a summation of the product of a Hamming window with a shifted version of a Hamming window, for various FFT sizes.

The windowing effects are able to be compensated for by adjusting the correlation values prior to searching the phase correlation surface for peaks. The overlap between the Hamming window w[i] and a horizontally shifted version of window w[x+i] is considered. As the shift increases, the energy in the product of the overlap decreases, and the energy in overlap of the actual image content decreases. The effect is able to be quantified as:

$$a[x] = \frac{\sum_{i=0}^{N-1} w[i]w[x+i]}{\sum_{i=0}^{N-1} w^2[i]}.$$

where evaluation of a[x] restrict to the range [−N/2, N/2]. FIG. 5 shows plots of a[x] for FFT sizes of N=16, 32 and 64. If the motion were negative, the plots would be symmetric extensions to the left. As an example of how to interpret a[x], according to the plot for FFT size of 16, the correlation peak for a block's motion of 3 is expected to be approximately 80% (0.8) of the correlation peak if the same block's motion were 0.

To compensate for the effect of fading peaks shown in FIG. 5, a shift-dependent gain $h_B[x,y]$ is able to be applied to the phase correlation surface s[x,y] prior to searching for peaks. The gain is applied as $$s_G[x,y] = s[x,y]h_B[x,y]. \tag{1}$$

Figures 6, 7:
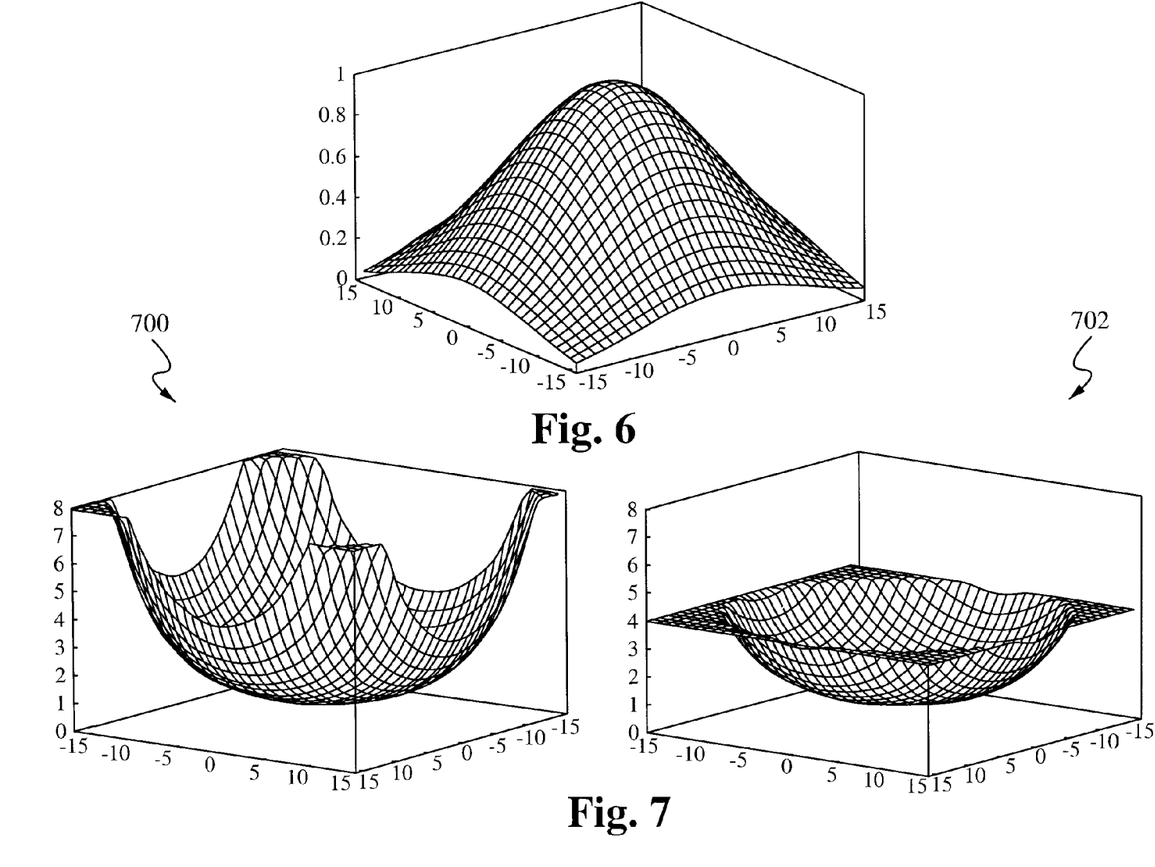
FIG. 6 illustrates a 2D model of phase correlation peak amplitude roll-off.
FIG. 7 illustrates an example of gain surfaces.

The shift-dependent gain is constructed as:

$$h_B[x,y] = \text{MIN}\left(\frac{1}{a[x,y]}, B\right), \tag{2}$$

where
   a[x,y] is the prediction for phase correlation peak roll-off;
   MIN(.) returns the minimum of its arguments; and
   B is a parameter to prevent excessive gain in s[x,y].
One choice of a[x,y] is a[x,y]=a[x] a[y], a separable extension of the curves in FIG. 5, shown in FIG. 6. FIG. 6 illustrates a 2D model of phase correlation peak amplitude roll-off for FFT size N=32. It is also possible to use approximations and variations to a[x]. The parameter B is a limiting value that prevents the gains from becoming too large for big x,y, without which would result excessive magnification of these regions of the phase correlation surface. A reasonable parameter choice is B=4. FIG. 7 shows two 2D examples of the gain surface for FFT size N=32, where the predictions in roll-off are used according to the graph from FIG. 6. FIG. 7 shows gain surfaces $h_B[x,y]$ for FFT size N=32, where graph 700 has B=8 and graph 702 has B=4. The minimum of each surface is located at shift(x,y)=(0,0), where $h_B[x,y]=1$.

Applying a gain surface such as shown in FIG. 7 increases the amplitude of peaks to compensate for the amplitude roll-off shown in FIG. 6. This results in significant improvements in the overall algorithm's ability to detect the correct motion from the phase correlation surface.

The curves in FIGS. 6 and 7 show both positive and negative indices for a[x,y] and $h_B[x,y]$. However, indices for s[x,y] and $s_G[x,y]$ are assumed to be positive integers 0, ..., N−1. The index arithmetic is performed modulo N, so that a[N−q]=a[−q], a[N−q, N−p]=a[−q,−p], and $h_B$[N−q, N−p]=$h_B$[−q,−p].

Figure 8:
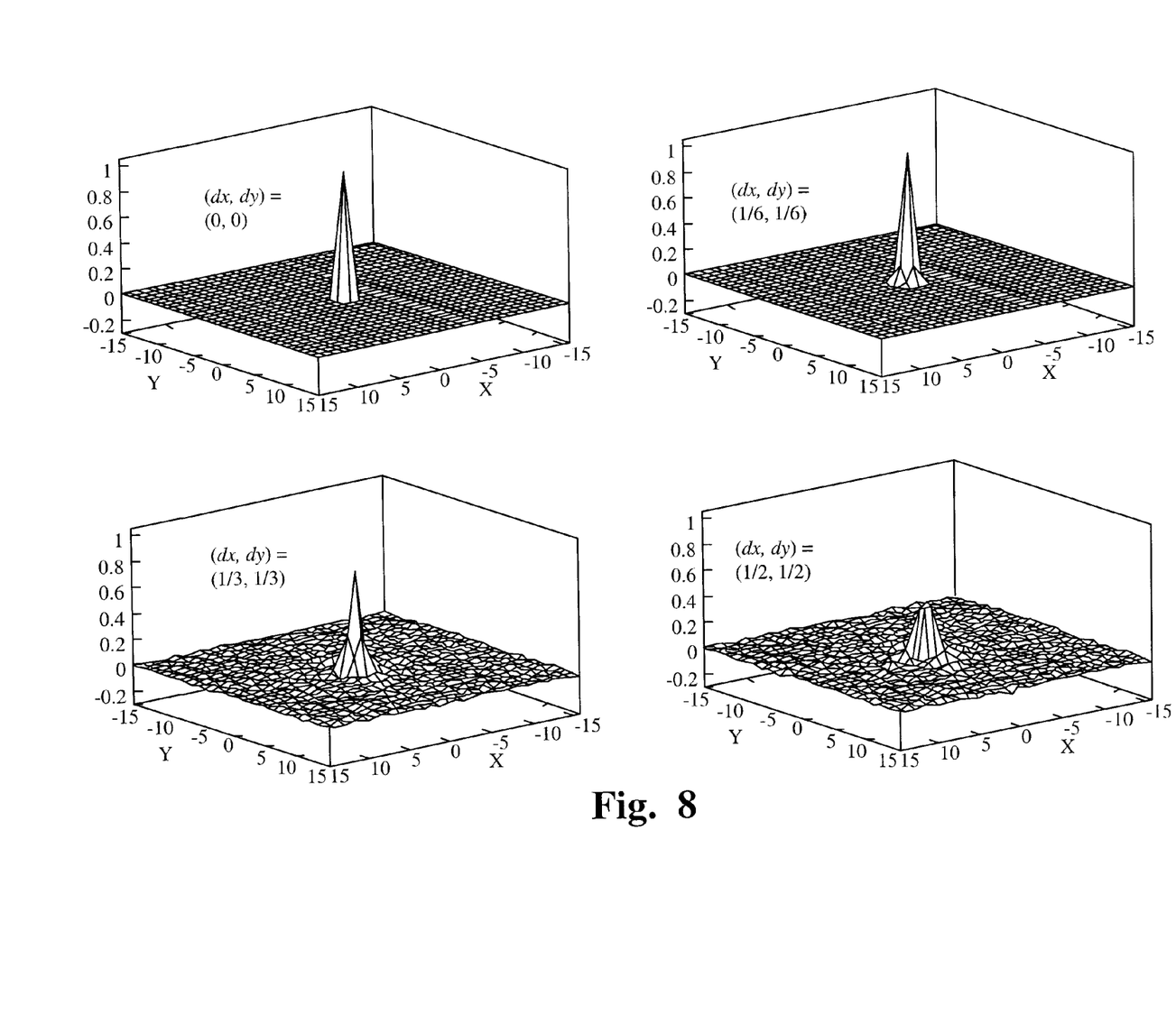
FIG. 8 illustrates examples of peaks in the phase correlation surface for different sub-pixel motions.

Matched filters to improve peak finding in the phase correlation surface are described herein. The previous section showed how the amplitude of the phase correlation peak becomes smaller with increasing motion, causing the peak to be more difficult to find. Another situation that causes the phase correlation amplitude to decrease is addressed: sub-pixel motion. For integer pel motion, it is well known that the phase correlation peak is approximately an impulse, with its energy concentrated at a single position. However, when the motion becomes sub-pixel, the peak in the phase correlation surface spreads out across multiple positions, which causes the amplitude of the peak to decrease. FIG. 8 illustrates four separate phase correlation surfaces for four different sub-pel motions. The integer motion at the top-left results in a clean impulse at exactly one position. As the sub-pixel motion increases, the figures show the progressive decreasing and spreading of the peak. For motion of (½, ½), the amplitude has decreased to approximately 40% of the value for motion of (0,0). Such dramatic decrease might not have much impact for examples shown, but the consequences are able to be dire for other situations when the phase correlation surfaces have more noise, or when the phase correlation peak is already diminished for other reasons.

To detect peaks whose energy is spread across multiple positions, matched filters are able to be used. A matched filter considers the expected signal, and then applies a matching filter to the observed data. The resulting detector is optimal for detecting the expected signal. In the case at hand, the observed data is the correlation surface s[x,y], or if amplitude gain is being used, $s_G[x,y]$. Although the procedure is able to be applied to $s_G[x,y]$, s[x,y] has been denoted as the surface on which peaks are detected. The expected signal is able to be determined according to phase correlation theory.

For a pure sub-pel motion (dx, dy) with no integer component, the sin c model for the peak is written as:

$$p[x,y;dx,dy]=\sin c(x-dx)\sin c(y-dy), \quad (3)$$

where (x,y) are integer indices, and dx and dy are each in the range [−1/2, 1/2]. The sin c function is defined as $$\sin c(x) = \begin{cases} 1, & x=0 \\ \dfrac{\sin(\pi x)}{\pi x}, & \text{else.} \end{cases}$$

For sub-pel motion of zero, (dx,dy)=(0,0), and p[x,y; 0,0] is a discrete impulse centered at (0,0). The model for the actual observed phase correlation surface is then $$s[x,y]=Ap[x-x_m,y-y_m;dx,dy]+N[x,y],$$

where A is the amplitude of the peak, $(x_m, y_m)$ is the integer component of the motion, (dx, dy) is the subpel component of the motion, and N[x,y] is an additive noise term.

The matched filter for the peak is defined as:

$$p_R[x,y;dx,dy]=K_R p[x,y;dx,dy],$$

where the normalization constant $K_R$ is as below, where the summation is over the support of the filter, $$K_R = \frac{1}{\sum p^2[x, y; dx, dy]}.$$

The shape of the peak is described by $p_R[x,y;dx,dy]$, which depends on the sub-pixel motion (dx,dy). The filter $p_R[x,y; dx,dy]$ is the optimal filter for detecting the peak. Unfortunately, at the time of peak finding the true sub-pel motion (dx,dy) is unknown, and hence the true shape of the peak $p_R[x,y; dx,dy]$ is unknown. The solution is to apply one or more matched filters as follows:

1. Consider M matched filters $p_R[x,y;mx_k,my_k]$, k=0, ..., M−1, with sub-pixel motion components $(mx_k,my_k)$.
2. For each k=0, ..., M−1, do peak finding using the matched filter $p_R[x,y; mx_k,my_k]$.
3. Retain as the motion estimation candidates those peaks that gave the best responses to the different matched filters.

This procedure tries different candidate matched filters to find peaks under the assumption that the true sub-pel motion is $(mx_k,my_k)$. The best/biggest peaks are those peaks whose assumed sub-pixel shifts give the best response according to the corresponding matched filter. Due to the scaling factors $K_R$, the sin c-based filters $p_R[x,y; dx,dy]$ do not interpolate the phase correlation surface.

Figure 9:
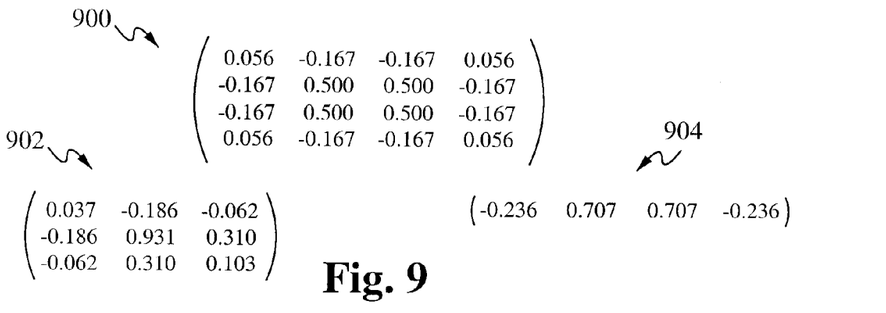
FIG. 9 illustrates examples of candidate matched filters.

If one assumes no sub-pixel motion, then $p_R[x,y;0,0]=\delta[x,y]$ (the discrete impulse function), and peak finding with the matched filter is equivalent to peak finding with no filtering at all, which is the common method typically assumed in the phase correlation literature. As suggested by FIG. 8, the point of maximum peak spreading is for (dx,dy)=(½, ½), which is the worst-case scenario for peak finding. It is highly recommended that one of the matched filters be for this case, for example $(mx_0, my_0)=$(½, ½). Additional matched filters for peak finding are able to be used, depending on the computational constraints of the system. In FIG. 9, several examples of $p_R[x,y;mx_k,my_k]$ for different sub-pel candidates $(mx_k, my_k)$ are shown. The candidate matched filter 900 is $p_R[x,y; ½, ½]$, with 4×4 filter support. The candidate matched filter 902 is $p_R[x,y; ¼, ¼]$, with 3×3 filter support. The candidate matched filter 904 is $p_R[x,y; ½, 0]$, with 4×1 filter support.

In practice, the impulse response of the matched filters $p_R[x,y;mx_k,my_k]$ is truncated (or windowed), so that only values over a relatively small range of x,y are used; FIG. 9 shows several such examples. In very-low complexity implementations, it is possible to truncate $p_R[x,y; mx_k,my_k]$ to a 2×2 filter. Furthermore, it is possible to consider only a single matched filter—that of the worst-case scenario, $(mx_0, my_0)=(\frac{1}{2}, \frac{1}{2})$. Using the single matched filter keeps complexity from becoming too high, while maximizing the peak-finding performance for the worst-case scenario. When using only a single matched filter of size 2×2 optimized for detecting half-pel motion, the scale $K_R$ of the filter is unimportant, and the peak detection filter is able to be simplified to $$p_R\left[x, y; \frac{1}{2}, \frac{1}{2}\right] = \begin{bmatrix} 1 & 1 \\ 1 & 1 \end{bmatrix} \quad (4)$$

Figure 10:
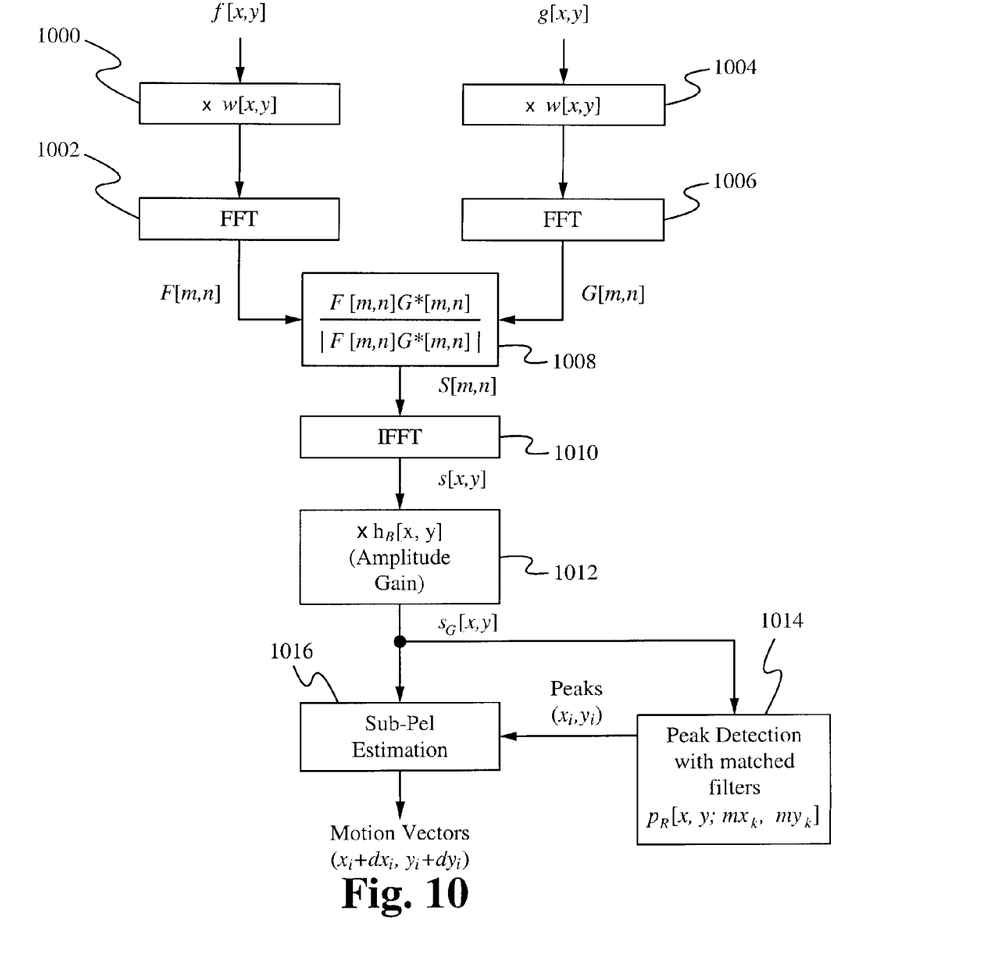
FIG. 10 illustrates a flowchart of improved phase correlation according to some embodiments.

FIG. 10 illustrates how the peak finding fits within the overall phase correlation algorithm. In the step 1000, point-wise multiplication of the N×N window in the current frame with window function w[x,y] is performed. In the step 1002, a FFT is applied to the result, which yields the complex values F[m,n]. In the step 1004, point-wise multiplication of the N×N window in the reference frame is performed with the window function w[x,y]. In the step 1006, a FFT is applied to the result, which yields the complex values G[m,n]. In the step 1008, in the normalization stage, the following equation is computed:

$$S[m, n] = \frac{F[m, n]G^*[m, n]}{|F[m, n]G^*[m, n]|},$$

where * denotes the complex conjugate, and | | represents the magnitude of the complex argument. In the step 1010, the IFFT of S[m,n] is computed to yield s[x,y], the phase correlation surface. In the step 1012, amplitude gain is applied to the phase correlation surface. In the step 1014, the K biggest peaks are identified from the phase correlation surface using matching filters. The indices of these peaks correspond to possible motions that are present between the N×N windows in the current and reference frames. The indices of these peaks are denoted as $(x_i,y_i)$, i=0, . . . , K−1. The indices are positive integers in 0, 1, . . . , N−1. A negative motion of −q leads to a peak at index position N−q. In the step 1016, if sub-pixel precision is used, sub-pixel estimates $(dx_i, dy_i)$ are computed for the peaks $(x_i,y_i)$ previously identified. As described above, any window is able to be used for the window function. The peaks in the correlation surface represent possible motions. Larger peaks indicate higher correlation, and the largest peak often indicates the dominant motion in the N×N window.

Figure 11:
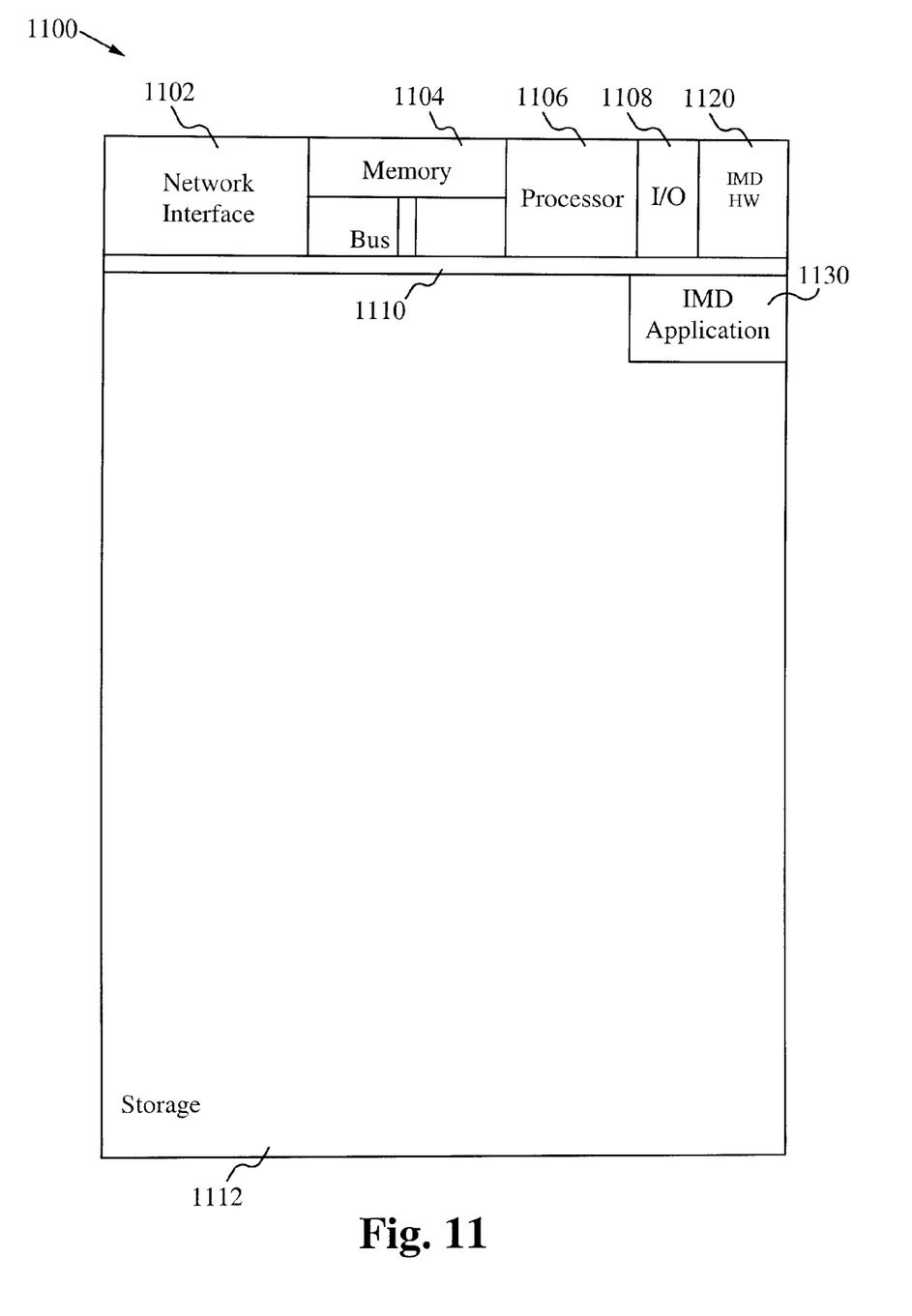
FIG. 11 illustrates a block diagram of an exemplary computing device configured to implement the method to increase the accuracy of phase correlation according to some embodiments.

FIG. 11 illustrates a block diagram of an exemplary computing device 1100 configured to implement the method to improve detection of movement with phase correlation according to some embodiments. The computing device 1100 is able to be used to acquire, store, compute, communicate and/or display information such as images and videos. For example, a computing device 1100 is able to acquire and store a video. The method to improve movement detection is able to be used when encoding an image or a video on the device 1100. In general, a hardware structure suitable for implementing the computing device 1100 includes a network interface 1102, a memory 1104, a processor 1106, I/O device(s) 1108, a bus 1110 and a storage device 1112. The choice of processor is not critical as long as a suitable processor with sufficient speed is chosen. The memory 1104 is able to be any conventional computer memory known in the art. The storage device 1112 is able to include a hard drive, CDROM, CDRW, DVD, DVDRW, flash memory card or any other storage device. The computing device 1100 is able to include one or more network interfaces 1102. An example of a network interface includes a network card connected to an Ethernet or other type of LAN. The I/O device(s) 1108 are able to include one or more of the following: keyboard, mouse, monitor, display, printer, modem, touchscreen, button interface and other devices. Improved movement detection application(s) 1130 used to perform the method to improve movement detection are likely to be stored in the storage device 1112 and memory 1104 and processed as applications are typically processed. More or less components than shown in FIG. 11 are able to be included in the computing device 1100. In some embodiments, improved movement detection hardware 1120 is included. Although the computing device 1100 in FIG. 11 includes applications 1130 and hardware 1120 for improved movement detection, the method to improve movement detection is able to be implemented on a computing device in hardware, firmware, software or any combination thereof.

In some embodiments, the improved movement detection application(s) 1130 include several applications and/or modules. In some embodiments, the improved movement detection application(s) 1130 includes modules such as a first window function module for applying a window function to a window of a current frame to obtain a current frame result, a first FFT module for applying a Fast Fourier Transform to the current frame result yielding a first set of complex values, a second window function module for applying the window function to the window of a reference frame to obtain a reference frame result, a second FFT module for applying the Fast Fourier Transform to the reference frame result yielding a second set of complex values, a normalizing module for normalizing a product of the second set of complex values and a complex conjugate of the first set of complex values, an IFFT module for computing an inverse Fast Fourier Transform to yield a phase correlation surface, an amplitude gain module for applying the amplitude gain to the phase correlation surface, a peak identification module with matched filters for identifying one or more peaks from the phase correlation surface, wherein indices of the peaks correspond to possible motions and a sub-pixel estimation module for computing sub-pixel estimates for previously identified peaks. In some embodiments, fewer or additional modules and/or sub-modules are able to be included. For example, in some embodiments, the Fast Fourier Transforms and the inverse Fast Fourier Transform are computed in a single module, or the Fast Fourier Transforms are computed in one module and the inverse Fast Fourier Transform is computed in another module.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-Ray® writer/player, a television, a home entertainment system or any other suitable computing device.

To utilize the method to improve movement detection with phase correlation, a user displays images or video such as on a digital camcorder, digital camera or television, and while the images or video are displayed, the method to improve movement detection automatically detects movement better, so that the images or video are displayed smoothly, with less noise, with improved dynamic range, or such that some other desired feature is achieved. The method to improve movement detection occurs automatically without user involvement. In some implementations, the method to improve movement detection is used while acquiring images or a video.

In operation, the method to improve movement detection with phase correlation performs phase correlation with one or more additional improvements. The first improvement applies a theoretically-derived and spatially-varying gain to the phase correlation surface. The gain compensates for peaks whose amplitudes have been decreased due to windowing effects; such effects are unavoidable in phase correlation. The second improvement uses concepts from matched filters to improve detection of peaks whose amplitudes are diminished due to a spreading of the peak energy into surrounding positions in the phase correlation surface. Peak detection filters allow such low-amplitude peaks to be properly detected. It is possible to use only the first method, or only the second method or both methods combined. The result is better motion detection which, in turn, generates better images and videos.

Some Embodiments of Method to Improve Detection of Motion with Phase Correlation 1. A method of performing phase correlation motion estimation in a video programmed in a memory in a device comprising:
   a. applying an amplitude gain to a phase correlation surface prior to detecting for peaks; and
   b. implementing a matched filter for peak detection.
2. The method of clause 1 wherein phase correlation motion estimation further comprises:
   a. applying a window function to a window of a current frame to obtain a current frame result;
   b. applying a Fast Fourier Transform to the current frame result yielding a first set of complex values;
   c. applying the window function to the window of a reference frame to obtain a reference frame result;
   d. applying the Fast Fourier Transform to the reference frame result yielding a second set of complex values;
   e. normalizing a product of the second set of complex values and a complex conjugate of the first set of complex values;
   f. computing an inverse Fast Fourier Transform to yield a phase correlation surface; and
   g. identifying one or more peaks from the phase correlation surface, wherein indices of the peaks correspond to possible motions.
3. The method of clause 2 further comprising implementing sub-pixel estimation.
4. The method of clause 1 wherein implementing the matched filter comprises:
   a. performing peak finding using the matched filter $p_R[x,y; mx_k,my_k]$ for each k=0 through M−1; and
   b. retaining as motion estimation candidates the biggest peaks from the matched filters.
5. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
6. A method of performing phase correlation motion estimation in a video programmed in a memory in a device comprising:
   a. applying a window function to a window of a current frame to obtain a current frame result;
   b. applying a Fast Fourier Transform to the current frame result yielding a first set of complex values;
   c. applying the window function to the window of a reference frame to obtain a reference frame result;
   d. applying the Fast Fourier Transform to the reference frame result yielding a second set of complex values;
   e. normalizing a product of the second set of complex values and a complex conjugate of the first set of complex values;
   f. computing an inverse Fast Fourier Transform to yield a phase correlation surface;
   g. applying an amplitude gain to a phase correlation surface prior to detecting for peaks; and
   h. identifying one or more peaks from the phase correlation surface, wherein indices of the peaks correspond to possible motions.
7. The method of clause 6 further comprising implementing sub-pixel estimation.
8. The method of clause 6 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
9. A method of performing phase correlation motion estimation in a video programmed in a memory in a device comprising:
   a. applying a window function to a window of a current frame to obtain a current frame result;
   b. applying a Fast Fourier Transform to the current frame result yielding a first set of complex values;
   c. applying the window function to the window of a reference frame to obtain a reference frame result;
   d. applying the Fast Fourier Transform to the reference frame result yielding a second set of complex values;
   e. normalizing a product of the second set of complex values and a complex conjugate of the first set of complex values;
   f. computing an inverse Fast Fourier Transform to yield a phase correlation surface; and
   g. identifying one or more peaks from the phase correlation surface using a matched filter, wherein indices of the peaks correspond to possible motions.
10. The method of clause 9 further comprising implementing sub-pixel estimation.
11. The method of clause 9 wherein using the matched filter comprises:
    a. performing peak finding using the matched filter $p_R[x,y; mx_k,my_k]$ for each k=0 through M−1; and
    b. retaining as motion estimation candidates the biggest peaks from the matched filters.
12. The method of clause 9 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
13. A system for performing phase correlation motion estimation in a video programmed in a memory in a device comprising:

a. an amplitude module for applying an amplitude gain to a phase correlation surface prior to detecting for peaks; and
b. a peak identification module with matched filters for identifying one or more peaks from the phase correlation surface, wherein indices of the peaks correspond to possible motions.

14. The system of clause 13 further comprising:
   a. a first window function module for applying a window function to a window of a current frame to obtain a current frame result;
   b. a first Fast Fourier Transform module for applying a Fast Fourier Transform to the current frame result yielding a first set of complex values;
   c. a second window function module for applying the window function to the window of a reference frame to obtain a reference frame result;
   d. a second Fast Fourier Transform module for applying the Fast Fourier Transform to the reference frame result yielding a second set of complex values
   e. a normalizing module for normalizing a product of the second set of complex values and a complex conjugate of the first set of complex values;
   f. an inverse Fast Fourier Transform module for computing an inverse Fast Fourier Transform to yield a phase correlation surface; and
   g. a peak identification module for identifying one or more peaks from the phase correlation surface, wherein indices of the peaks correspond to possible motions.

15. The system of clause 14 further comprising a sub-pixel estimation module for computing sub-pixel estimates for previously identified peaks.

16. The system of clause 13 wherein identifying the peaks comprises:
   a. performing peak finding using the matched filter $p_R[x,y; mx_k, my_k]$ for each k=0 through M−1; and
   b. retaining as motion estimation candidates the biggest peaks from the matched filters.

17. The system of clause 13 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

18. A camera device comprising:
   a. a video acquisition component for acquiring a video;
   b. an encoder for encoding the image, including phase correlation motion estimation, by:
      i. applying an amplitude gain to a phase correlation surface prior to detecting for peaks; and
      ii. implementing a matched filter for peak detection; and
   c. a memory for storing the encoded video.

19. The camera device of clause 18 wherein phase correlation motion estimation further comprises:
   a. applying a window function to a window of a current frame to obtain a current frame result;
   b. applying a Fast Fourier Transform to the current frame result yielding a first set of complex values;
   c. applying the window function to the window of a reference frame to obtain a reference frame result;
   d. applying the Fast Fourier Transform to the reference frame result yielding a second set of complex values;
   e. normalizing a product of the second set of complex values and a complex conjugate of the first set of complex values;
   f. computing an inverse Fast Fourier Transform to yield a phase correlation surface; and
   g. identifying one or more peaks from the phase correlation surface, wherein indices of the peaks correspond to possible motions.

20. The camera device of clause 19 further comprising computing sub-pixel estimates for previously identified peaks.

21. The camera device of clause 18 wherein implementing the matched filter comprises:
   a. performing peak finding using the matched filter $p_R[x,y; mx_k, my_k]$ for each k=0 through M−1; and
   b. retaining as motion estimation candidates the biggest peaks from the matched filters.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of performing phase correlation motion estimation in a video programmed in a memory in a device comprising:
   a. applying a shift-dependent gain to a phase correlation surface prior to detecting for peaks, wherein the shift-dependent gain utilizes a minimum function with a prediction for phase correlation peak roll-off and a parameter to prevent excessive gain in the phase correlation surface; and
   b. implementing matched filters for peak detection wherein implementing the matched filters comprises:
      i. performing peak finding using the matched filters $p_R[x,y; mx_k, my_k]$ for each k=0 through M−1, wherein $p_R$ is the peak, x and y are integer indices, $mx_k, my_k$ are sub-pixel motion components and k=0 through M−1 is a range starting from 0 to a number of matched filters minus 1; and
      ii. retaining as motion estimation candidates the biggest peaks from the matched filters.

2. The method of claim 1 wherein phase correlation motion estimation further comprises:
   a. applying a window function to a window of a current frame to obtain a current frame result;
   b. applying a Fast Fourier Transform to the current frame result yielding a first set of complex values;
   c. applying the window function to the window of a reference frame to obtain a reference frame result;
   d. applying the Fast Fourier Transform to the reference frame result yielding a second set of complex values;
   e. normalizing a product of the second set of complex values and a complex conjugate of the first set of complex values;
   f. computing an inverse Fast Fourier Transform to yield a phase correlation surface; and
   g. identifying one or more peaks from the phase correlation surface, wherein indices of the peaks correspond to possible motions.

3. The method of claim 2 further comprising implementing sub-pixel estimation.

4. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

5. A method of performing phase correlation motion estimation in a video programmed in a memory in a device comprising:
   a. applying a window function to a window of a current frame to obtain a current frame result;
   b. applying a Fast Fourier Transform to the current frame result yielding a first set of complex values;
   c. applying the window function to the window of a reference frame to obtain a reference frame result;
   d. applying the Fast Fourier Transform to the reference frame result yielding a second set of complex values;
   e. normalizing a product of the second set of complex values and a complex conjugate of the first set of complex values;
   f. computing an inverse Fast Fourier Transform to yield a phase correlation surface;
   g. applying a shift-dependent gain to a phase correlation surface prior to detecting for peaks, wherein the shift-dependent gain utilizes a minimum function with a prediction for phase correlation peak roll-off and a parameter to prevent excessive gain in the phase correlation surface; and
   h. identifying one or more peaks from the phase correlation surface, wherein indices of the peaks correspond to possible motions.

6. The method of claim 5 further comprising implementing sub-pixel estimation.

7. The method of claim 5 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

8. A method of performing phase correlation motion estimation in a video programmed in a memory in a device comprising:
   a. applying a plurality of window functions to obtain a plurality of frame results;
   b. applying a plurality of Fast Fourier Transforms to yield a plurality of complex values;
   c. normalizing a first subset of the plurality of complex values and a complex conjugate of a second subset of the plurality of complex values;
   d. computing an inverse Fast Fourier Transform to yield a phase correlation surface;
   e. applying a shift-dependent gain to a phase correlation surface prior to detecting for peaks, wherein the shift-dependent gain utilizes a minimum function with a prediction for phase correlation peak roll-off and a parameter to prevent excessive gain in the phase correlation surface and f. identifying one or more peaks from the phase correlation surface using a matched filter, wherein indices of the peaks correspond to possible motions.

9. The method of claim 8 further comprising implementing sub-pixel estimation.

10. The method of claim 8 wherein using the matched filter comprises:
    a. performing peak finding using the matched filter $p_{R\,[x,y;\,mxk},my_k]$ for each k=0 through M−1, wherein $p_R$ is the peak, x and y are integer indices, $mx_k,my_k$ are sub-pixel motion components and k=0 through M−1 is a range starting from 0 to a number of matched filters minus 1; and
    b. retaining as motion estimation candidates the biggest peaks from the matched filters.

11. The method of claim 8 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

12. A system for performing phase correlation motion estimation in a video programmed in a memory in a device comprising:
    a. an amplitude module for applying a shift-dependent gain to a phase correlation surface prior to detecting for peaks, wherein the shift-dependent gain utilizes a minimum function with a prediction for phase correlation peak roll-off and a parameter to prevent excessive gain in the phase correlation surface; and
    b. a peak identification module with matched filters for identifying one or more peaks from the phase correlation surface, wherein indices of the peaks correspond to possible motions, wherein identifying the peaks comprises:
       i. performing peak finding using the matched filters $p_{R[x,y;\,mxk},my_k]$ for each k=0 through M−1, wherein $p_R$ is the peak, x and y are integer indices, $mx_k,my_k$ are sub-pixel motion components and k=0 through M−1 is a range starting from 0 to a number of matched filters minus 1; and
       ii. retaining as motion estimation candidates the biggest peaks from the matched filters.

13. The system of claim 12 further comprising:
    a. a first window function module for applying a window function to a window of a current frame to obtain a current frame result;
    b. a first Fast Fourier Transform module for applying a Fast Fourier Transform to the current frame result yielding a first set of complex values;
    c. a second window function module for applying the window function to the window of a reference frame to obtain a reference frame result;
    d. a second Fast Fourier Transform module for applying the Fast Fourier Transform to the reference frame result yielding a second set of complex values
    e. a normalizing module for normalizing a product of the second set of complex values and a complex conjugate of the first set of complex values;
    f. an inverse Fast Fourier Transform module for computing an inverse Fast Fourier Transform to yield a phase correlation surface; and
    g. a peak identification module for identifying one or more peaks from the phase correlation surface, wherein indices of the peaks correspond to possible motions.

14. The system of claim 13 further comprising a sub-pixel estimation module for computing sub-pixel estimates for previously identified peaks.

15. The system of claim 12 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

16. A camera device comprising:
  a. a video acquisition component for acquiring a video;
  b. an encoder for encoding the image, including phase correlation motion estimation, by:
    i. applying a shift-dependent gain to a phase correlation surface prior to detecting for peaks, wherein the shift-dependent gain utilizes a minimum function with a prediction for phase correlation peak roll-off and a parameter to prevent excessive gain in the phase correlation surface; and
    ii. implementing a single matched filter for peak detection, wherein the single matched filter comprises $p_{,[x, y; \frac{1}{2}, \frac{1}{2}]}$, wherein $p_R$ is the peak and x and y are integer indices, further wherein the single matched filter is a size 2×2; and
  c. a memory for storing the encoded video.

17. The camera device of claim 16 wherein phase correlation motion estimation further comprises:
  a. applying a window function to a window of a current frame to obtain a current frame result;
  b. applying a Fast Fourier Transform to the current frame result yielding a first set of complex values;
  c. applying the window function to the window of a reference frame to obtain a reference frame result;
  d. applying the Fast Fourier Transform to the reference frame result yielding a second set of complex values;
  e. normalizing a product of the second set of complex values and a complex conjugate of the first set of complex values;
  f. computing an inverse Fast Fourier Transform to yield a phase correlation surface; and
  g. identifying one or more peaks from the phase correlation surface, wherein indices of the peaks correspond to possible motions.

18. The camera device of claim 17 further comprising computing sub-pixel estimates for previously identified peaks.

* * * * *